United States Patent
Norgaard et al.

(10) Patent No.: US 8,037,221 B2
(45) Date of Patent: Oct. 11, 2011

(54) DYNAMIC ALLOCATION OF DMA BUFFERS IN INPUT/OUTPUT ADAPTORS

(75) Inventors: Steven Paul Norgaard, Rochester, MN (US); Brian Eric Bakke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 12/014,853

(22) Filed: Jan. 16, 2008

(65) Prior Publication Data

US 2009/0182969 A1 Jul. 16, 2009

(51) Int. Cl.
*G06F 12/00* (2006.01)
*G06F 12/02* (2006.01)
*G06F 3/00* (2006.01)
*G06F 13/00* (2006.01)
*G06F 13/12* (2006.01)

(52) U.S. Cl. ............... 710/56; 710/14; 710/18; 710/19; 710/22; 710/52; 710/62; 710/63; 710/64; 710/72; 710/73; 710/74

(58) Field of Classification Search .............. None
See application file for complete search history.

(56) References Cited

U.S. PATENT DOCUMENTS

| | | | | | |
|---|---|---|---|---|---|
| 5,307,468 | A | * | 4/1994 | Schlage | 711/163 |
| 5,748,877 | A | * | 5/1998 | Dollahite et al. | 714/36 |
| 5,951,687 | A | * | 9/1999 | Chan et al. | 713/2 |
| 6,460,136 | B1 | * | 10/2002 | Krohmer et al. | 713/2 |
| 2003/0002477 | A1 | * | 1/2003 | Israel et al. | 370/352 |
| 2005/0204189 | A1 | * | 9/2005 | Akiba | 714/12 |
| 2005/0229042 | A1 | * | 10/2005 | Crowell et al. | 714/36 |

* cited by examiner

*Primary Examiner* — Tanh Nguyen
(74) *Attorney, Agent, or Firm* — Rabin & Berdo, PC

(57) ABSTRACT

A method and apparatus for dynamic allocation of DMA buffers in the DRAM banks of an I/O adaptor. The method and apparatus determine the functional status of the adaptor, allocate critical, volatile DMA buffers in non-critical DRAM banks if the adaptor is fully functional, and allocate critical, volatile DMA buffers in critical DRAM banks if the adaptor is partially functional.

17 Claims, 4 Drawing Sheets

DYNAMIC ALLOCATION OF DMA BUFFERS IN INPUT/OUTPUT ADAPTORS

BACKGROUND

1. Technical Field

The present invention relates to input/output (I/O) adaptor optimization. More specifically, it relates to a method and system for allowing dynamic allocation of Direct Memory Access (DMA) buffers in DRAM banks of I/O adaptors.

2. Background Information

An I/O adaptor denotes a functional assembly that is adapted to provide an interface between a CPU and an input/output device or aggregate of devices adapted to compute, process, transmit, receive, retrieve, store, display, detect, record, reproduce, or utilize any form of information, intelligence or data. It acts as a translator between the computer and various input/output devices. I/O adaptors manage the communication between such devices and the computer so that the CPU is free to perform other tasks. I/O adaptors of one type or another can be found for diskette drives, hard drives, CD-ROM drives, Redundant Array of Independent Disks (RAID), high performance communications (e.g., Ethernet) and many other components.

Modern computer systems and networks require reliable and effective means for the processing, transmission, reception and storage of data. Customer requirements are usually highly application-dependent. For example, RAID systems vary in their interconnection architectures, physical packaging and dimensions, redundancy methods, fail-safe mechanisms, and the like. And the disk drives available for use within RAID systems also vary in their physical specifications, storage capacities, performance capabilities, and electrical interfaces. Therefore, a great deal of flexibility is required of I/O adaptors. I/O adaptors must also have good fault tolerance. A defective component of the I/O adaptor thus should have no or only minimum impact on the whole adaptor.

DMA is the hardware mechanism that allows peripheral components to transfer their I/O data directly to and from main memory without the need to involve the system processor. Use of this mechanism can greatly increase throughput to and from a device, because a great deal of computational overhead is eliminated. Data transfer can be triggered in two ways: either the software asks for data or the hardware asynchronously pushes data to the system. In either case, the driver method allocates a DMA buffer so that the data can be effectively transferred between system memory and I/O devices. A DMA mapping is a combination of allocating a DMA buffer and generating an address for that buffer that is accessible by the device.

SUMMARY

A method, computer program product and computer system for dynamic allocation of DMA buffers in the DRAM banks of an I/O adaptor, which includes determining the functional status of the adaptor, allocating critical, volatile DMA buffers in non-critical DRAM banks if the adaptor is fully functional, and allocating critical, volatile DMA buffers in critical DRAM banks if the adaptor is partially functional.

DETAILED DESCRIPTION

Figure 1:
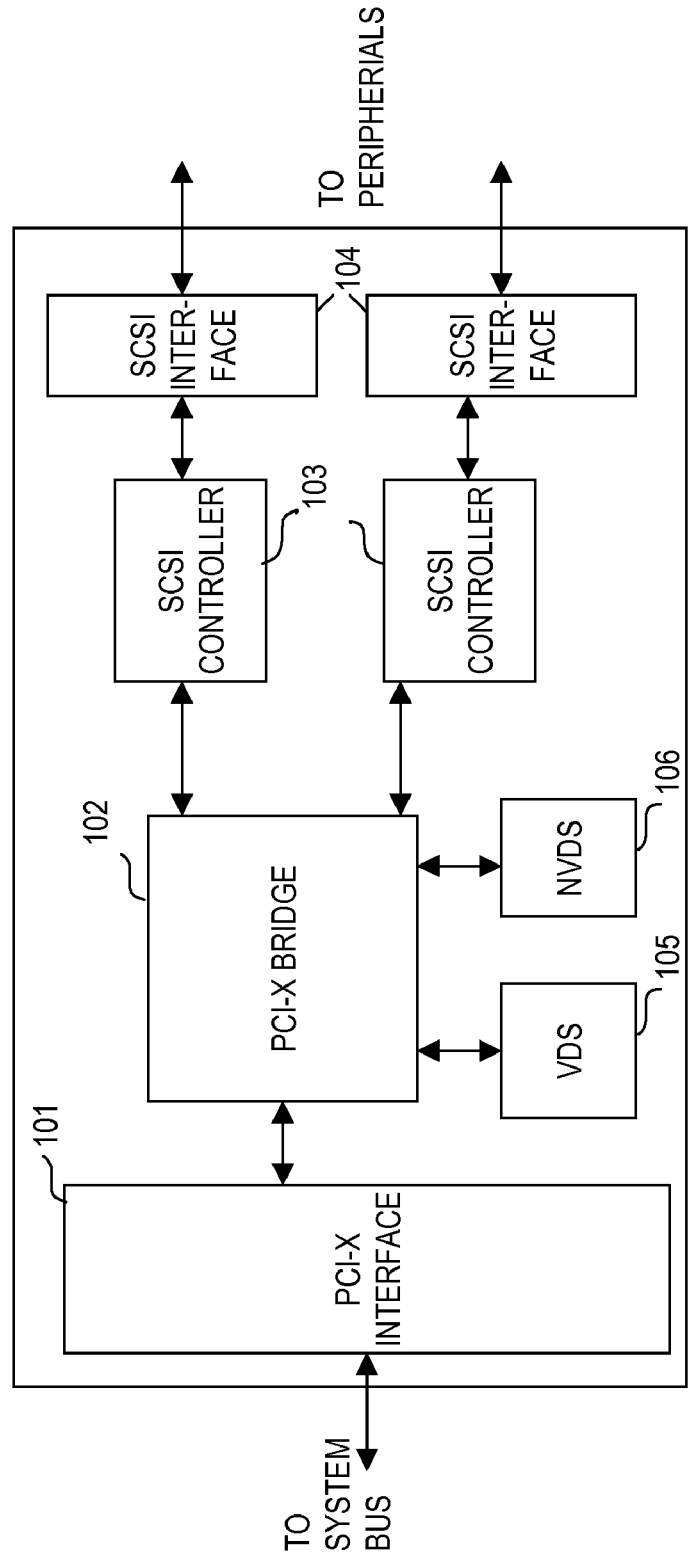
FIG. 1 is a conceptual diagram of an I/O adaptor with asymmetric DRAM banks.

The invention will now be described in more detail by way of example with reference to the embodiments shown in the accompanying Figures. It should be kept in mind that the following described embodiments are only presented by way of example and should not be construed as limiting the inventive concept to any particular physical configuration. Further, if used and unless otherwise stated, the terms "upper," "lower," "front," "back," "over," "under," and similar such terms are not to be construed as limiting the invention to a particular orientation. Instead, these terms are used only on a relative basis.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
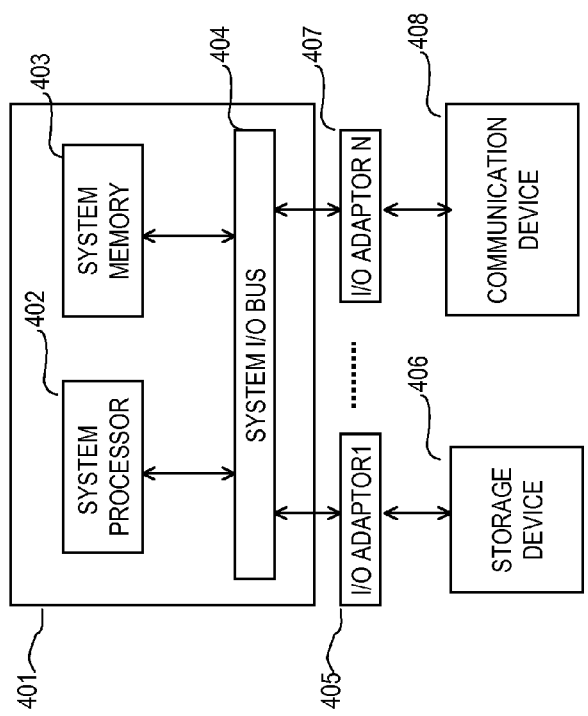
FIG. 4 is a conceptual diagram illustrating a computer system with I/O adaptors.

FIG. 4 is a block diagram that illustrates a computer system in which the present invention may be applied. Reference number 401 generally indicates the computer system. The computer system 401 includes a system processor (CPU) 402 and system memory 403. The computer system 401 is connected to I/O adaptors 405 and 407 via system I/O bus 404. In this exemplary embodiment, I/O adaptor 405 is connected to a storage device 406, and the I/O adaptor 407 is connected to a high performance communication device 408.

I/O adaptors must provide reliable performance and good fault tolerance for servers (internet, email, news, database, file, etc.), embedded systems, telecommunications, workstations, and mission-critical applications. The requirements demand I/O adaptors with various capabilities, some of which may be non-critical and/or relocatable for a variety of purposes. One of these capabilities is to have asymmetric banks of DRAM, which are asymmetric in terms of size, bus width, access characteristics, volatility, performance, cost, etc.

An example of an I/O adaptor with asymmetric DRAM banks is illustrated in FIG. 1. The PCI-X bridge 102 is connected to the system bus (not shown in FIG. 1) via the PCI-X interface 101, and data from systems are transmitted to or received from peripheral devices (such as storage devices, networking devices, etc) through the SCSI controllers 103 via SCSI interfaces 104. Two sets of DRAM banks are used in this I/O adaptor. One set of DRAM banks is the Nonvolatile Data Store (NVDS) 106 used primarily as a Write Cache. This also contains static allocations for other needed DMA buffers (which are critical, but do not have to be nonvolatile). The NVDS 106 is a set of highly utilized but lower performance DRAM bank, and is a critical memory in that the adaptor is not functional if this memory is defective. The second set of asymmetric banks is the Volatile Data Store (VDS) 105 used primarily as a Read Cache. This is a lower utilized but higher performance DRAM bank, and is non-critical memory as the adaptor can run in degraded mode (i.e., no Read Cache) if this memory is defective.

In this example, the adaptor is not fully functional if the non-critical memory is defective. In order to keep the adaptor functional when the non-critical DRAM bank is defective, and improve the performance of the adaptor by balancing the workloads, there must be dynamic allocation of the sizes and locations of needed DMA buffers in the DRAM banks.

In one embodiment of the present invention, the functional status of the adaptor is determined at adaptor Initial Program Load (IPL) time. If this adaptor is fully functional, all critical, volatile DMA buffers are allocated in the high performance, lower utilized, non-critical DRAM bank. If this adaptor is partially functional, all critical, volatile buffers will be allocated in the lower performance, higher utilized, critical DRAM bank. Therefore, the adaptor will run in degraded mode if the non-critical memory is defective. If the non-critical memory is operational, then some DMA buffers in both memories can dynamically change in size and location, so that the bandwidth demand is distributed between DRAM banks and the workload is balanced. The invention works for non-symmetric DRAM banks with different performance attributes. If the non-critical DRAM bank fails, the present invention enables a resilient adaptor that will continue running in degraded mode until repair action is made.

Figure 2:
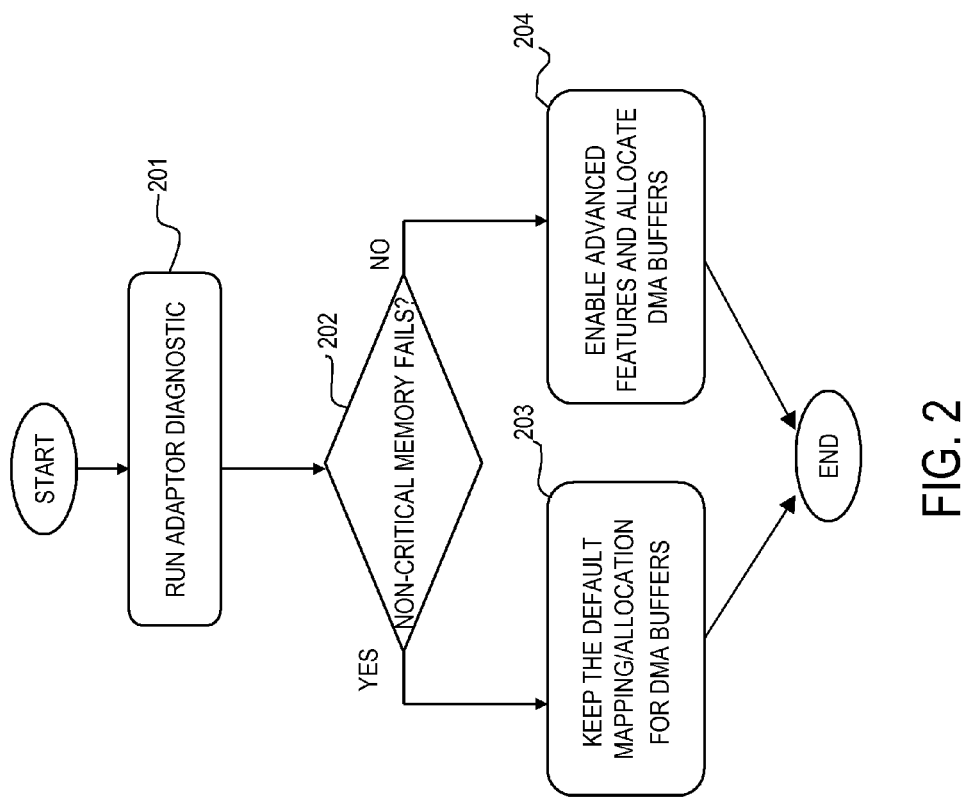
FIG. 2 is a flowchart showing the allocation decision process.

FIG. 2 is a flowchart demonstrating an embodiment of the present invention. First in state 201, the adapter diagnostic is run based on configuration information in the boot segment of the flash in the I/O adaptor. The status of the non-critical memory is then determined (state 202). If "non-critical" memory fails, the default/conservative mapping/allocation is used for DMA buffers (state 203). If "non-critical" memory is operational, a second DMA buffer mapping is created, which enables advanced features (e.g. Read Cache) and relocates DMA buffers for performance/configuration reasons (state 204). For example, for performance reasons, the Wrapping+

Header DMA buffers are moved from the NVDS into the VDS, the Volatile Pages DMA buffers in NVDS is increased in size, and the Read Cache DMA buffer in VDS is increased in size. The mapping makes better use of the available DMA buffer space. Other mappings could be created based on other criteria such as tuning available DRAM Bandwidth.

Figure 3:
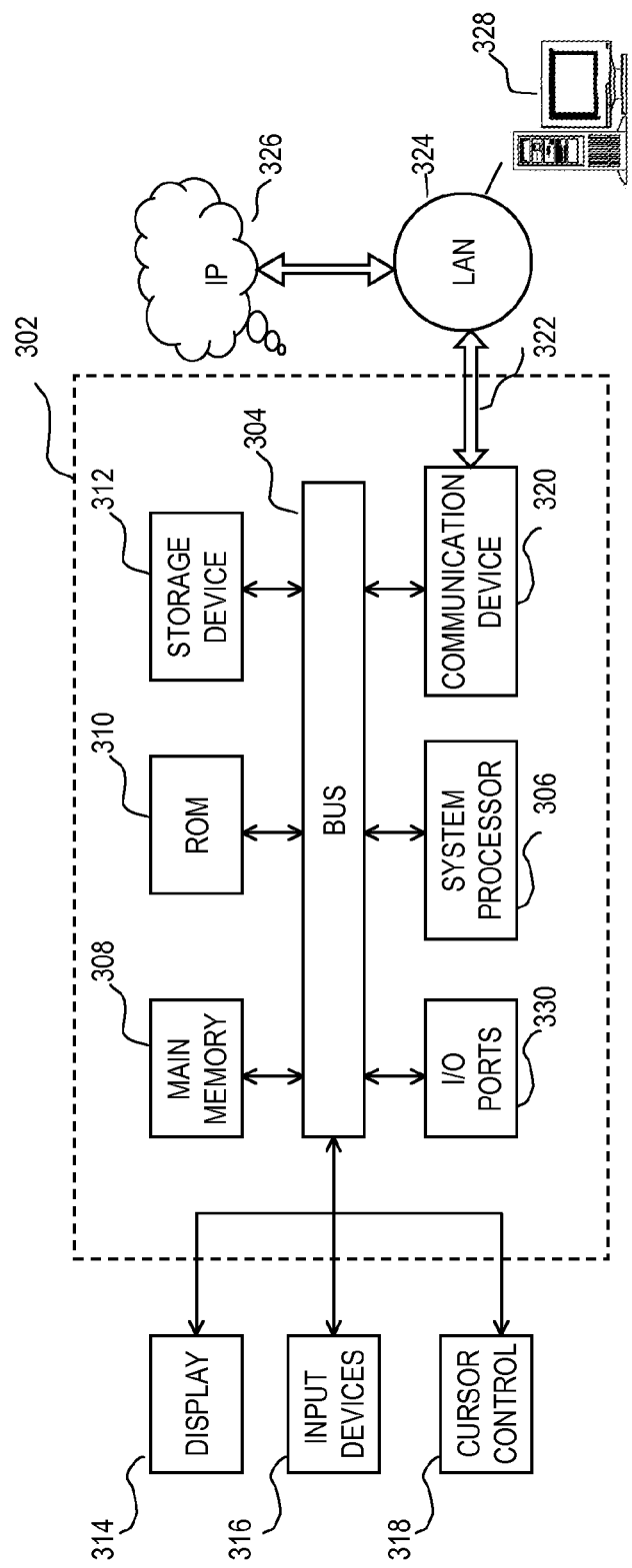
FIG. 3 is a conceptual diagram of a computer system.

FIG. 3 illustrates a computer system (302) upon which the present invention may be implemented. The computer system may be any one of a personal computer system, a work station computer system, a lap top computer system, an embedded controller system, a microprocessor-based system, a digital signal processor-based system, a hand held device system, a personal digital assistant (PDA) system, a wireless system, a wireless networking system, etc. The computer system includes a bus (304) or other communication mechanism for communicating information and a processor (306) coupled with bus (304) for processing the information. The computer system also includes a main memory, such as a random access memory (RAM) or other dynamic storage device (e.g., dynamic RAM (DRAM), static RAM (SRAM), synchronous DRAM (SDRAM), flash RAM), coupled to bus for storing information and instructions to be executed by processor (306). In addition, main memory (308) may be used for storing temporary variables or other intermediate information during execution of instructions to be executed by processor. The computer system further includes a read only memory (ROM) 310 or other static storage device (e.g., programmable ROM (PROM), erasable PROM (EPROM), and electrically erasable PROM (EEPROM)) coupled to bus 304 for storing static information and instructions for processor. A storage device (312), such as a magnetic disk or optical disk, is provided and coupled to bus for storing information and instructions. This storage device is an example of a computer readable medium.

The computer system also includes input/output ports (330) to input signals to couple the computer system. Such coupling may include direct electrical connections, wireless connections, networked connections, etc., for implementing automatic control functions, remote control functions, etc. Suitable interface cards may be installed to provide the necessary functions and signal levels.

The computer system may also include special purpose logic devices (e.g., application specific integrated circuits (ASICs)) or configurable logic devices (e.g., generic array of logic (GAL) or re-programmable field programmable gate arrays (FPGAs)), which may be employed to replace the functions of any part or all of the method as described with reference to FIG. 2. Other removable media devices (e.g., a compact disc, a tape, and a removable magneto-optical media) or fixed, high-density media drives may be added to the computer system using an appropriate device bus (e.g., a small computer system interface (SCSI) bus, an enhanced integrated device electronics (IDE) bus, or an ultra-direct 15 memory access (DMA) bus). The computer system may additionally include a compact disc reader, a compact disc reader-writer unit, or a compact disc jukebox, each of which may be connected to the same device bus or another device bus.

The computer system may be coupled via bus to a display (314), such as a cathode ray tube (CRT), liquid crystal display (LCD), voice synthesis hardware and/or software, etc., for displaying and/or providing information to a computer user. The display may be controlled by a display or graphics card. The computer system includes input devices, such as a keyboard (316) and a cursor control (318), for communicating information and command selections to processor (306). Such command selections can be implemented via voice recognition hardware and/or software functioning as the input devices (316). The cursor control (318), for example, is a mouse, a trackball, cursor direction keys, touch screen display, optical character recognition hardware and/or software, etc., for communicating direction information and command selections to processor (306) and for controlling cursor movement on the display (314). In addition, a printer (not shown) may provide printed listings of the data structures, information, etc., or any other data stored and/or generated by the computer system.

The computer system performs a portion or all of the processing steps of the invention in response to processor executing one or more sequences of one or more instructions contained in a memory, such as the main memory. Such instructions may be read into the main memory from another computer readable medium, such as storage device. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The computer system also includes a communication interface coupled to bus. The communication interface (320) provides a two-way data communication coupling to a network link (322) that may be connected to, for example, a local network (324). For example, the communication interface (320) may be a network interface card to attach to any packet switched local area network (LAN). As another example, the communication interface (320) may be an asymmetrical digital subscriber line (ADSL) card, an integrated services digital network (ISDN) card or a modem to provide a data communication connection to a corresponding type of telephone line. Wireless links may also be implemented via the communication interface (320). In any such implementation, the communication interface (320) sends and receives electrical, electromagnetic or optical signals that carry digital data streams representing various types of information.

Network link (322) typically provides data communication through one or more networks to other data devices. For example, the network link may provide a connection to a computer (326) through local network (324) (e.g., a LAN) or through equipment operated by a service provider, which provides communication services through a communications network (328). In preferred embodiments, the local network and the communications network preferably use electrical, electromagnetic, or optical signals that carry digital data streams. The sig nals through the various networks and the signals on the network link and through the communication interface, which carry the digital data to and from the computer system, are exemplary forms of carrier waves transporting the information. The computer system can transmit notifications and receive data, including program code, through the network(s), the network link and the communication interface.

It should be understood, that the invention is not necessarily limited to the specific process, arrangement, materials and components shown and described above, but may be susceptible to numerous variations within the scope of the invention.

What is claimed is:

1. A method for dynamic allocation of a DMA buffer in DRAM banks of an I/O adaptor, the DRAM banks including a lowly-utilized high-performance first bank and a highly-utilized low-performance second bank, the method comprising:
- determining whether the adaptor is fully-functional or partially-functional;
- allocating the DMA buffer in the first bank if the adaptor is fully functional; and
- allocating the DMA buffer in the second bank if the adaptor is partially functional.

2. The method of claim 1, wherein the allocating the DMA buffer in the second bank includes using an allocation or mapping for the DMA buffer without enabling a read cache.

3. The method of claim 1, wherein the allocating the DMA buffer in the first bank includes enabling advanced features and relocating the DMA buffer to improve performance.

4. A computer program product for dynamic allocation of a DMA buffer in DRAM banks of an I/O adaptor, the DRAM banks including a lowly-utilized high-performance first bank and a highly-utilized low-performance second bank, the computer program product comprising:
- a non-transitory computer usable medium having computer usable program code embodied therewith, the computer usable program code comprising:
- instructions to determine whether the adaptor is fully-functional or partially-functional; and
- instructions to allocate the DMA buffer in the first bank if the adaptor is fully functional; and
- instructions to allocate the DMA buffer in the second bank if the adaptor is partially functional.

5. The computer program product of claim 4, wherein the instructions to allocate the DMA buffer in the second bank includes using an allocation or mapping for the DMA buffer without enabling a read cache.

6. The computer program product of claim 4, wherein the instructions to allocate the DMA buffer in the first bank includes enabling advanced features and relocating the DMA buffer to improve performance.

7. The computer program product of claim 4, wherein the instructions to determine comprise instructions to run an adaptor diagnostic based on configuration information in a boot segment of the I/O adaptor.

8. A computer system comprising:
- a processor;
- a memory operatively coupled to the processor;
- a storage device operatively coupled to the processor and memory; and
- a computer program product for dynamic allocation of a DMA buffer in DRAM banks of an I/O adaptor, the DRAM banks including a lowly-utilized high-performance first bank and a highly-utilized low-performance second bank, the computer program product comprising:
- a non-transitory computer usable medium having computer usable program code embodied therewith, the computer usable program code comprising:
- instructions to determine whether the adaptor is fully-functional or partially-functional; and
- instructions to allocate the DMA buffer in the first bank if the adaptor is fully functional; and
- instructions to allocate the DMA buffer in the second bank if the adaptor is partially functional.

9. The system of claim 8, wherein the instructions to allocate the DMA buffer in the second bank includes using an allocation or mapping for the DMA buffer without enabling a read cache.

10. The system of claim 8, wherein the instructions to allocate the DMA buffer in the first bank includes enabling advanced features and relocating the DMA buffer to improve performance.

11. The system of claim 8, wherein the instructions to determine comprise instructions to run an adaptor diagnostic based on configuration information in a boot segment of the I/O adaptor.

12. The method of claim 1, further comprising adjusting a size of the allocated DMA buffer or a location of the allocated DMA buffer, if the adaptor is fully functional.

13. The method of claim 3, wherein the advanced features includes a feature of a read cache.

14. The computer program product of claim 4, further comprising instructions to adjust a size of the allocated DMA buffer or a location of the allocated DMA buffer, if the adaptor is fully functional.

15. The computer program product of claim 6, wherein the advanced features includes a feature of a read cache.

16. The computer system of claim 8, further comprising instructions to adjust a size of the allocated DMA buffer or a location of the allocated DMA buffer, if the adaptor is fully functional.

17. The computer system of claim 10, wherein the advanced features includes a feature of a read cache.

* * * * *